(12) United States Patent
Mitcham et al.

(10) Patent No.: US 7,288,870 B2
(45) Date of Patent: Oct. 30, 2007

(54) STATOR CORE

(75) Inventors: Alan J Mitcham, Ponteland (GB); Anthony G Razzell, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/849,882

(22) Filed: May 21, 2004

(65) Prior Publication Data

US 2004/0245883 A1    Dec. 9, 2004

(30) Foreign Application Priority Data

Jun. 5, 2003 (GB) ................. 0312871.7

(51) Int. Cl.
*H02K 1/00* (2006.01)
(52) U.S. Cl. ........................ 310/261; 310/45
(58) Field of Classification Search ............ 310/43–45, 310/52–59, 216–218
See application file for complete search history.

(56) References Cited

U.S. PATENT DOCUMENTS

| | | | |
|---|---|---|---|
| 2,279,014 A | * | 4/1942 | Sawyer ........................ 310/258 |
| 3,207,934 A | | 9/1965 | Robinson |
| 3,254,372 A | * | 6/1966 | Hofbauer ..................... 425/123 |
| 3,293,468 A | * | 12/1966 | Alger .......................... 310/166 |
| 3,371,612 A | * | 3/1968 | Aller ....................... 417/423.11 |
| 3,504,153 A | * | 3/1970 | Beyersdorf .............. 219/69.17 |

FOREIGN PATENT DOCUMENTS

| | | |
|---|---|---|
| DE | 2 238 562 AB | 2/1974 |
| EP | 0 461 906 A | 12/1991 |

\* cited by examiner

*Primary Examiner*—Thanh Lam
(74) *Attorney, Agent, or Firm*—W. Warren Taltavull; Manelli Denison & Selter PLLC

(57) ABSTRACT

A stator core 2 comprises laminations (9) of low loss stator iron forming a body of magnetic nature and lamination components (11) of high thermal conductivity material regularly arranged within that body. The high thermal conductivity components (11) increasing the effective radial thermal conductivity rate of the core 2 whereby temperature gradients are reduced in comparison with previous stator cores. Thus, there is a reduction in operational temperature of the electrical insulation on the stator windings.

36 Claims, 2 Drawing Sheets

STATOR CORE

FIELD OF THE INVENTION

The present invention relates to stator cores and more particularly to stator cores used in electrical machines with electro-magnetic windings of a compact size.

BACKGROUND OF THE INVENTION

Inherently, heat is generated by losses in the windings and the stator core of an electrical machine such as a motor or generator. These losses are due to electrical resistance in the windings and losses in the iron. These losses take the form of thermal energy. This thermal energy must be removed by thermal conduction out of the stator core. An example of an electrical machine is a permanent magnet electrical machine which takes the form of a stator core held in a frame with inwardly facing windings which interact in operation with a rotor core which normally carries permanent magnets. Thus, with electrical current sequentially passed through the windings, the rotor can be driven and turned. Alternatively, if the rotor is driven by other means then electrical current is generated in the windings.

Alternating magnetic flux in the core causes iron losses (eddy currents and hysteresis) which causes heating. Thus, the core is made from low-loss magnetic material such as silicon-iron, which reduces the eddy currents (due to low electrical conductivity) and also reduces the hysteresis loss. Inevitably low electrical conductivity means low thermal conductivity which thus inhibits cooling.

In small and medium-sized permanent magnet (PM) machines, cooling is normally achieved by heat transfer at the airgap or at the stator outside diameter (in some cases cooling ducts may also be used towards the outside of the laminated stator core). Certain high power density machines may instead have sleeved liquid cooling passages at the stator outer diameter (OD) or in the stator housing. Effective radial conduction of heat towards the stator outer diameter (OD) and towards the airgap is therefore essential.

FIG. 1 is a schematic illustration of a cross-section of a part of an electrical machine with a permanent magnet rotor. FIG. 1 is provided simply to illustrate positional relationships for better understanding of the present invention. Thus, the electrical machine 1 has a stator core 2 located within a stator housing 3. The rotor 4 is located in the middle of the stator. The rotor 4 presents permanent magnets 5 to windings 6 and teeth 14 of the stator core 2. The windings 6 are located in stator slots 19 formed between the stator teeth 14 which protrude inwards from the core 2. These magnets 5 and windings 6 interact as described above to either drive rotor 4 motion or convert that rotor 4 motion caused by other means into electrical power. Some air cooling passages 7 are shown near the outer rim 15 of the stator core 2. In any event, heat energy generated by losses in the core 2 and the windings 6 and teeth 14 must be conducted through the core 2 to these passages 7 and/or to indirect air cooling vents 8 on the outer peripheral surface/rim of the core 2.

As indicated above the core 2 is made from materials which have been formulated for low iron losses (eddy currents and hysteresis) to minimize electrical eddy current losses in the core 2. Unfortunately such materials have lower thermal conductivity properties than is desired for radial heat conduction to the cooling surfaces.

In the above circumstances, heat energy must be conducted radially outwards from the windings 6 through the teeth 14 and core 2 towards the cooling passages 7. However, their relatively low level of thermal conductivity means that there are significant transient and steady-state temperature differentials between the windings 6 and the outside diameter of the core 2. These differentials are detrimental to operational efficiency and/or may cause premature failure of electrical insulation within the electrical machine.

The winding electrical insulation (typically polyester or polyimide) has limited temperature capability and it is the winding that always gets the hottest with consequent implications for the power rating of the electrical machine.

SUMMARY OF THE INVENTION

In accordance with the present invention there is provided a stator core for an electrical machine, the stator core comprising high thermal conductivity components within a low loss stator iron assembly, the high thermal conductivity components distributed and in a proportion relative to the low loss stator iron assembly whereby the stator core remains electro-magnetically functional within an electrical machine whilst the high thermal conductivity components in use facilitate heat transfer from electro-magnetic windings within that machine.

Normally, the low loss stator iron comprises low loss magnetic laminations with a typical lamination thickness of 0.1 to 0.35 mm. Typically, the appropriate material is a high resistivity silicon steel or cobalt iron alloy with each lamination insulated for eddy current inhibition with a suitable electrical insulating coating such as an organic or inorganic varnish or an oxide layer.

Generally, the high thermal conductivity components are laminations disposed at intervals within the low loss stator iron assembly. Alternatively, the high thermal conductivity components are coatings or films deposited or otherwise applied to the desired parts of the low loss stator iron assembly. Additionally, the high thermal conductivity components may be an adhesive or resin or other matrix which is loaded with a high thermal conductivity material such as aluminium nitride, silicon carbide, carbon fibres, carbon nanotubes, diamond-like carbon, carbon fullerines or titanium boride to form a composite.

Typically, the proportion of components of high thermal conductivity is in the range up to 20%, preferably 10% to 15%. Possibly, the high thermal conductivity components are copper or aluminium laminations with a thickness of 0.5 mm to 11.0 mm, disposed at intervals of 3 to 8 mm, preferably 4 to 6 mm within the stator core.

Possibly, the components of high thermal conductivity have face surfaces to improve conduction transfer with the low loss stator iron assembly.

Possibly, there is a high thermal conductivity cement, paste, adhesive, gel or other means between the high thermal conductivity components and the low loss stator iron to facilitate good thermal transfer between them.

Possibly, radially outer edges of the high thermal conductivity components extend beyond the low loss stator iron assembly to facilitate in use greater heat transfer to a stator housing and/or cooling means for the stator core. Normally, these radially outer edges of respective adjacent high thermal conductivity components are staggered or offset relative to each other. Advantageously, the high thermal conductivity components are associated with circumferential bands for greater heat dissipation.

Possibly, radially inner edges of the high thermal conductivity components extend marginally beyond the stator core inwards towards the rotor to facilitate heat transfer to any air flowing in the airgap.

Also in accordance with the present invention there is provided an electrical machine including a stator core as described above.

BRIEF DESCRIPTION OF THE DRAWINGS

An embodiment of the present invention will now be described by way of example only with reference to FIG. 1 along with FIG. 2 illustrating a longitudinal section of a stator core with its windings 6 and FIG. 3 illustrating tab projections to further improve heat transfer.

DETAILED DESCRIPTION OF THE INVENTION

Figure 1:
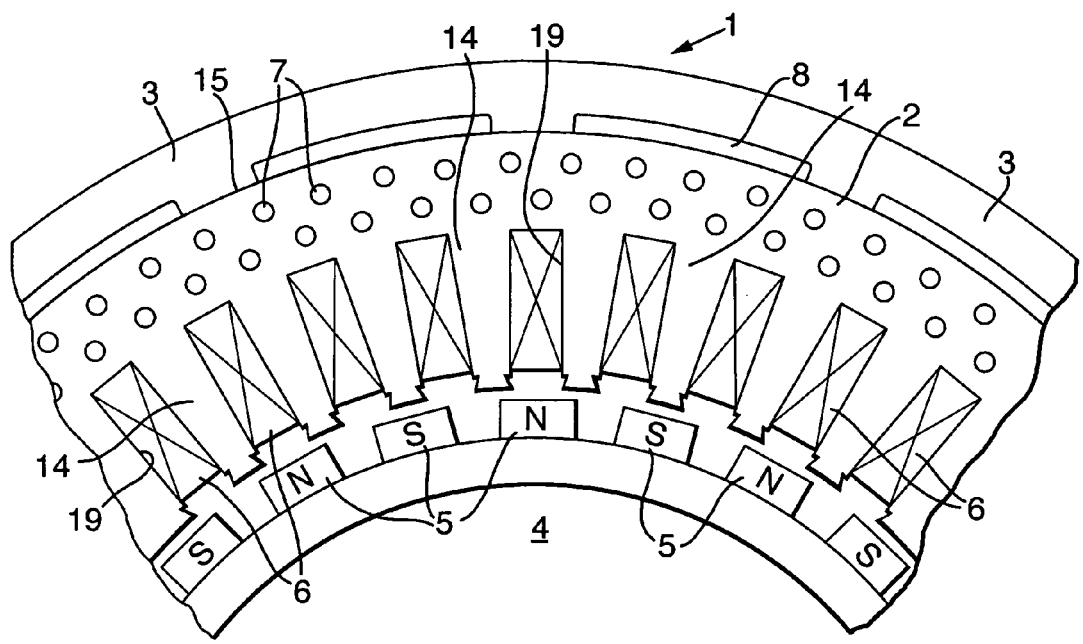
Figure 2:
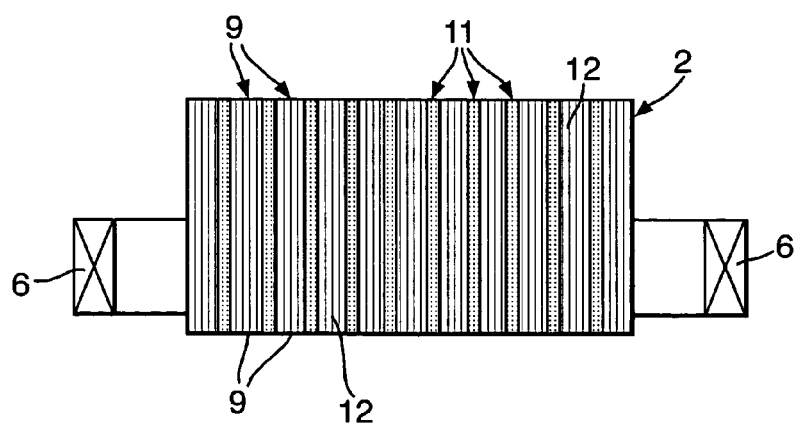

As indicated in FIG. 1 the stator core 2 has windings 6 in slots 19 which face inwards towards a rotor 4 which presents permanent magnets 5. Nevertheless, it will be appreciated that a rotor 4 could take the windings for electro-magnetic action and the stator have the permanent magnets or both could be provided with windings for electrical machine operation. The present invention in particular relates to means of improving heat conduction from these windings 6 and more particularly through the core teeth between these windings 6 for greater temperature control. FIG. 2 provides a cross-sectional view through the core 2 in a direction perpendicular to the plane of the drawing in FIG. 1.

The core 2 is formed as an assembly from a number of laminations 9 of low loss stator iron having high electrical resistivity and a lesser number of laminations 11 of high thermal conductivity material. By implication the high thermal conductivity material will generally not be capable of providing magnetic action through the windings 6. The purpose of the high thermal conductivity laminations is to act as a means to improve thermal conductivity in the core 2 whilst retaining the operability of the core 2 with respect to action in an electrical machine. Thus, the proportion of high thermal conductivity material will typically be in the range up to 20%, preferable 10-15% of the core 2.

The high thermal conductivity laminations 11 are generally distinct components secured appropriately within a notional base body or an assembly of low loss stator iron also formed from laminations. Use of laminations 9, 11 allows accurate control of the specific location of the high thermal conductivity components 11 but other approaches may be taken as outlined later below.

The high thermal conductivity laminations 11 of the core 2 are secured to the low loss stator iron laminations 9 to achieve good thermal conductivity between them. Typically, the magnetic laminations 9 may be stacked to form lamination packs of between 3 mm and 8 mm, preferably between 4 mm and 6 mm which are then sandwiched between high thermal conductivity laminations of 0.5 mm to 1.0 mm thickness. Thus, good thermal conductivity may be achieved by simply ensuring clean surface to surface contact. Alternatively, a high thermal conductivity cement or similar means may be used to ensure good thermal contact and transfer between the low loss stator iron assembly of the core 2 and the high thermal conductivity components 11 of that core 2.

Typically, the high conductivity components 11 are formed from copper or aluminium alloy or similar material. Copper may be plated on one side of the magnetic laminations. The magnetic lamination material 9 may be pre-coated with copper before the laminations are punched. Each lamination 9 will have an insulating layer on one or both sides above the copper plated surface. In such circumstances, it will be possible to use laminations made in accordance with previous procedure with a thickness typically of 0.2 mm and then apply by plating a high thermal conductivity layer, e.g. copper at a thickness of typically 0.025 mm and an insulating coating with a thickness typically up to 0.005 mm. As with other laminated stator systems it is necessary to ensure that inner edges between laminations do not include electrical conductivity bridges such as burrs between them.

The present invention incorporates component laminations 11 of high thermal conductivity into an assembly of low loss stator iron formed from laminations 9 of an appropriate magnetic material. Thus, the core 2 may comprise laminations 9 of a magnetic steel such as low loss silicon-iron or cobalt-iron interspersed at regular intervals with laminations 11 of high thermal conductivity materials such as copper or aluminium. These high thermal conductivity laminations 11 in effect provide express heat conductor pathways directly to the outside diameter of the core 2. Alternatively, such high thermal conductivity laminations may take the form of coatings or layers, eg of copper or aluminium, bonded onto the magnetic laminations (for example by electroplating, rolling, spraying, diffusion). For such layers, a layer of oxide, eg copper oxide, aluminium oxide, grown on the surface (for example via heating in air or anodising) would be able to act an an electrical insulator between laminations.

The high thermal conductivity lamination may also take the form of composites containing high thermal conductivity carbon fibres, carbon nanotubes, exfoliated graphite, carbon fullerine or other high conductivity forms of carbon. In the case of fibres it is important to align them in a radial direction to maximise radial thermal conductivity. This may be done by winding fibres in a toroidal fashion around a former of similar dimensions to the stator laminations (to create a sheets of material with high thermal conductivity in the radial direction). Alternatively, the fibres may be wound directly round one or more stator laminations in a toroidal fashion to create a permanently bonded coating on both sides. In both cases the fibres may be pre-impregnated with a resin or adhesive. In the case of carbon nanotubes, the use of spun yarn in which the carbon nanotubes are aligned would offer an advantage over randomly oriented carbon nanotubes. Such yarn could be wound in a toroidal fashion in a similar manner to that suggested above for high thermal conductivity carbon fibres.

It will be understood that by introduction of the high thermal conductivity laminations or coatings 11 in the core 2 the magnetic flux densities in the stator core 2 are altered. A typical prior permanent magnet electrical machine envisaged by the present invention will have teeth and core magnetic flux densities respectively of 1.6 tesla and 1.4 tesla at normal full load. By the present invention, up to 20% of the active core 2 length may be formed by high thermal conductivity but non-magnetic laminations or coatings 11 which then provides teeth and core 2 magnetic flux densities of approximately 2 and 1.75 tesla. These densities are acceptable with magnetic materials such as silicon-iron or cobalt iron laminations.

In theory, a 15% introduction of high thermal conductivity laminations 11 will generally increase the effective radial thermal conductivity to in the order of 78 $Wm^{-1}K^{-1}$, assuming laminations of copper with a thermal conductivity of around 380 Wm$^{-1}$K$^{-1}$ and a base high resistivity assembly thermal conductivity of around 25 Wm$^{-1}$K$^{-1}$. In such circumstances, a reduction in the temperature gradient between the teeth and the core 2 in excess of 60% is possible. However, these values may be reduced in practice due to thermal impedance axially between insulated laminations.

With regard to the overall improvement in thermal gradients it will also be understood that the increased magnetic flux densities in the teeth and core 2 will cause greater iron losses and so necessitate transfer of additional heat energy. Calculations have shown that a useful reduction in maximum temperature is achievable, despite the slight increase in losses.

The laminations 9, 11 of the stator core, whether of low loss or high thermal conductivity will normally be punched and pressed with an identical or very similar geometry. However, where desirable, radially outer edges and/or radially inner edges of the high thermal conductivity laminations 11 may extend beyond the low loss laminations 9.

The radially outer edges of the laminations 11 may extend into the core housing 3 to facilitate greater heat transfer to that housing 3 for heat energy dissipation. Thus, these radially outer edges will act as tabs, pins, pedestals or other heat transfer features which enter receptive apertures in the core housing 3. The tabs will be staggered or offset relative to each other for further improvement in heat transfer. The tabs, pins may be used in conjunction with impingement cooling.

Figure 3:
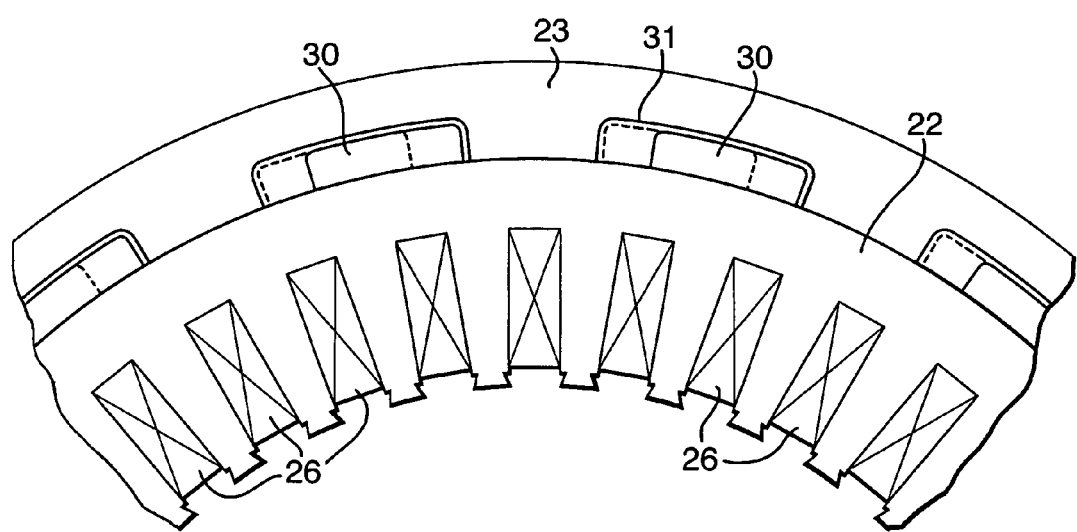

FIG. 3 illustrates a stator core 22 in which windings 26 face towards a rotor (not shown). Generally, the configuration depicted in FIG. 3 is similar to that depicted in FIG. 1 except that tab projections 30 extend outwardly into a housing 23. These tab projections 30 are staggered to improve air cooling as air passes over the tab 30 surfaces. The tabs 30 project outwardly from the high thermal conductivity copper laminations 11 into cooling passages 31 in the housing 23. In such circumstances, there will be greater heat transfer to the cooling air passing through the passages 31.

The radially inner edges of the laminations 11 may extend slightly towards the rotating rotor 4. Thus, these radially inner edges will at least agitate air within the air gap between the stator core 2 and the rotor 4 to facilitate cooling by inducing air turbulence.

Further improvement in radial heat transfer from the stator core may be achieved by using thick high conductivity laminations at the core ends. Such laminations will also reduce the stray losses at the stator ends, as long as consideration is given to the required end lamination thickness. Use of thick copper laminations (or plates) for reducing stray loss at the end of the stator core is already established for much larger electrical machines. Typically, the end laminations will be made from an alloy such as copper-chrome with sufficient strength to act as a clamping plate for the stator core. The thickness of the end laminations to minimise axial stray flux and its associated stray loss depends on the operating frequency.

As indicated above there are a number of alternatives to use of copper or aluminium or their alloys as the high thermal conductivity lamination components. Thus, a high thermal conductivity carbon fibre or composite carbon fibre material such as copper or aluminium metal-matrix composites can be used. Electrically insulating but thermally conductive materials e.g. aluminium nitride or silicon carbide may also be used. These materials may also be used in composite form using a resin or adhesive as a matrix. In the form of coatings, high conductivity materials will afford a more intimate contact with stator laminations and therefore more closely approach the theoretical improvements as previously indicated.

It will be understood that thermal contact between the respective laminations 9, 11 is a prime determinant of stator core efficiency in accordance with the present invention. Thus, the respective surfaces are normally held in a clamped relationship to maximise heat transfer by minimising any air gap. Thermally conductive cements can also be used as long as electrical insulation is maintained.

As indicated above and shown in FIG. 1 the stator core 2 is located within a stator housing 3. This housing 3 may incorporate a circumferential thermally conducting shell or layer between the core 2 and housing or at least segments for greater thermal dissipation about and through the housing 3. This circumferential band or segments may be a distinct component or applied to the core as a coating to the core outside diameter (OD). In any event, the band or segments must be machined or otherwise shaped to a smooth surface for good thermal contact.

Possibly, there will be no electrical insulation between the high thermal conductivity lamination components and the surface laminations of the low loss stator iron assembly. Thus, any constraining effect upon heat transfer caused by such electrical insulation will be reduced.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A stator core for an electrical machine, the stator core comprising high thermal conductivity components within a low loss stator iron assembly, the high thermal conductivity components providing heat conductor pathways to facilitate heat transfer and heat dissipation from electromagnetic windings within the electrical machine, the low loss stator iron assembly comprising low loss stator iron laminations of a material, the high thermal conductivity components comprising coatings applied to the laminations of the low loss stator iron assembly wherein the high thermal conductivity laminations comprises carbon fibres wherein said carbon fibres are arranged to extend radially.

2. A stator core as claimed in claim 1, wherein said laminations are in the range of 0.1 to 0.35 mm thick.

3. A stator core as claimed in claim 1, wherein said material is one of a high resistivity silicon steel and cobalt iron alloy and each lamination of the low loss stator iron is insulated for eddy current inhibition.

4. A stator core as claimed in claim 1, wherein the proportion of components of high thermal conductivity is in the range up to 20%.

5. A stator core as claimed in claim 1, wherein the low loss stator iron assembly presents a repeated pack width in the range of 3 mm to 8 mm of low loss stator iron either side of a width of high thermal conductivity component in the range of 0.5 mm to 1.0 mm.

6. A stator core as claimed in claim 1, wherein there is a high thermal conductivity cement, adhesive, paste, gel or other means between the high thermal conductivity components and the low loss stator iron assembly to facilitate good thermal transfer between them.

7. A stator core as claimed in claim 1, wherein the thermal conductivity components have radially outer edges, the radially outer edges of the high thermal conductivity components extend beyond the body of the low loss stator iron assembly to facilitate in use greater heat transfer to a stator housing and/or cooling means for the stator core.

8. A stator core as claimed in claim 7, wherein the radially outer edges of respective adjacent high thermal conductivity components comprise tabs, pins, pedestals or other heat transfer features which are staggered or offset relative to each other between components.

9. A stator core as claimed in claim 7, wherein a high thermal conductivity layer is provided for better thermal contact between the stator core and a housing for the stator core.

10. A stator core as claimed in claim 9 wherein the high thermal conductivity layer is a coating on the outside of the stator core or on the inside of the housing or both.

11. A stator core as claimed in claim 1 wherein the high thermal conductivity coating comprises copper or aluminium.

12. A stator core as claimed in claim 1 wherein an insulating coating is arranged on the high thermal conductivity coating.

13. A stator core as claimed in claim 12 wherein the insulating coating comprises copper oxide or aluminium oxide.

14. A stator core for an electrical machine as claimed in claim 1 wherein the material is silicon steel.

15. A stator core for an electrical machine as claimed in claim 1 wherein the material is cobalt iron alloy.

16. A stator core for an electrical machine as claimed in claim 1 wherein each lamination is insulated with an organic electrical insulating coating.

17. A stator core for an electrical machine as claimed in claim 1 wherein each lamination is insulated with an inorganic varnish electrical insulating coating.

18. A stator core for an electrical machine as claimed in claim 1 wherein each lamination is insulated with an oxide electrical insulating coating.

19. An electrical machine comprising a rotor, a stator and a core, the core comprising high thermal conductivity components within a low loss iron assembly, the high thermal conductivity components providing heat conductor pathways to facilitate heat transfer and heat dissipation from electromagnetic windings within the electrical machine, the low loss stator iron assembly comprising low loss stator iron laminations of a material, the high thermal conductivity components comprising coatings applied to the laminations of the low loss stator iron assembly wherein the high thermal conductivity components comprises carbon fibres wherein said carbon fibres are arranged to extend radially.

20. An electrical machine as claimed in claim 19 wherein the electrical machine is a permanent magnet electrical machine.

21. An electrical machine as claimed in claim 20 wherein the rotor carries permanent magnets and the stator carries windings.

22. An electrical machine as claimed in claim 21 wherein the core is a stator core.

23. An electrical machine as claimed in claim 20 wherein the rotor carries windings and the stator carries permanent magnets.

24. An electrical machine as claimed in claim 23 wherein the core is a rotor core.

25. An electrical machine as claimed in claim 19 wherein high thermal conductivity components are arranged at the ends of the core.

26. A stator core as claimed in claim 19 wherein the high thermal conductivity coating comprises copper or aluminium.

27. A stator core as claimed in claim 19 wherein an insulating coating is arranged on the high thermal conductivity coating.

28. A stator core as claimed in claim 27 wherein the insulating coating comprises copper oxide or aluminium oxide.

29. A stator core for an electrical machine, the stator core comprising high thermal conductivity components within a low loss iron assembly, the high thermal conductivity component providing heat conductor pathways to facilitate heat transfer and heat dissipation from electromagnetic windings within the electrical machine, the low loss stator iron assembly comprising laminations of a material, the high thermal conductivity components comprising laminations within the low loss stator iron assembly, the high thermal conductivity laminations comprising one of an adhesive, a resin and other matrix, which is loaded with a high thermal conductivity material wherein the high thermal conductivity components are selected from the group comprising composite carbon fibre material, carbon fibre copper metal matrix composite, carbon fibre aluminium metal matrix composite, carbon nanotube composite, exfoliated graphite composite, carbon fullerine composite, silicon nitride and aluminium nitride wherein the said carbon fibres are arranged to extend radially.

30. A stator core as claimed in claim 29 wherein the high thermal conductivity laminations comprises carbon nanotubes, the carbon nanotubes are arranged to extend radially.

31. A stator core for an electrical machine, the stator core comprising high thermal conductivity components within a low loss iron assembly, the high thermal conductivity components providing heat conductor pathways to facilitate heat transfer and heat dissipation from electromagnetic windings within the electrical machine, the low loss stator iron assembly comprising laminations of a material, the high thermal conductivity components comprising laminations within the low loss stator iron assembly, the high thermal conductivity laminations comprising an electrically insulating and thermally conductive material wherein the high thermal conductivity laminations comprises carbon fibres wherein said carbon fibres are arranged to extend radially.

32. A stator core as claimed in claim 31 wherein the high thermal conductivity components are selected from the group comprising composite carbon fibre material, carbon fibre copper metal matrix composite, carbon fibre aluminium metal matrix composite, carbon nanotube composite, exfoliated graphite composite, carbon fullerine composite, silicon nitride and aluminium nitride.

33. A stator core as claimed in claim 31 wherein the electrically insulating and thermally conductive material comprises aluminium nitride or silicon carbide.

34. An electrical machine comprising a rotor, a stator and a core, the core comprising high thermal conductivity components within a low loss iron assembly, the high thermal conductivity components providing heat conductor pathways to facilitate heat transfer and heat dissipation from electromagnetic windings within the electrical machine, the low loss stator iron assembly comprising low loss stator iron laminations of a material, the high thermal conductivity components comprising laminations within the low loss stator iron assembly, the high thermal conductivity laminations comprising one of an adhesive, a resin and other matrix, which is loaded with a high thermal conductivity material wherein the high thermal conductivity laminations comprises carbon fibres wherein said carbon fibres are arranged to extend radially.

35. An electrical machine comprising a rotor, a stator and a core, the core comprising high thermal conductivity components within a low loss iron assembly, the high thermal conductivity components providing heat conductor pathways to facilitate heat transfer and heat dissipation from electromagnetic windings within the electrical machine, the low loss stator iron assembly comprising low loss stator iron laminations of a material, the high thermal conductivity components comprising laminations within the low loss stator iron assembly, the high thermal conductivity laminations comprising an electrically insulating and thermally conductive material wherein the high thermal conductivity laminations comprises carbon fibres wherein said carbon fibres are arranged to extend radially.

36. A stator core as claimed in claim 35 wherein the electrically insulating and thermally conductive material comprises aluminium nitride or silicon carbide.

* * * * *